(12) United States Patent
Ramadan

(10) Patent No.: US 7,409,153 B2
(45) Date of Patent: Aug. 5, 2008

(54) STEREOSCOPIC UNIVERSAL DIGITAL CAMERA ADAPTER

(75) Inventor: Samer Ramadan, Newfields, NH (US)

(73) Assignee: Mission3-D Holdings, Ltd., Tripoli (LB)

( * ) Notice: Subject to any disclaimer, the term of this patent is extended or adjusted under 35 U.S.C. 154(b) by 153 days.

(21) Appl. No.: 10/545,527

(22) PCT Filed: Feb. 13, 2004

(86) PCT No.: PCT/US2004/004331

§ 371 (c)(1),
(2), (4) Date: Aug. 15, 2005

(87) PCT Pub. No.: WO2004/073294

PCT Pub. Date: Aug. 26, 2004

(65) Prior Publication Data

US 2006/0056836 A1   Mar. 16, 2006

Related U.S. Application Data

(63) Continuation of application No. 10/378,531, filed on Mar. 3, 2003, now abandoned, and a continuation of application No. 10/378,253, filed on Mar. 3, 2003, now abandoned, and a continuation of application No. 10/366,099, filed on Feb. 13, 2003, now abandoned.

(51) Int. Cl.
*G03B 35/00* (2006.01)
*G03B 17/00* (2006.01)

(52) U.S. Cl. .................................. 396/329; 396/428

(58) Field of Classification Search ................. 396/329, 396/419–428, 450, 535; 353/6–9, 100–101, 353/103–118; 355/22; 352/57–65; 359/458, 359/462, 466–467, 470, 472–477
See application file for complete search history.

(56) References Cited

U.S. PATENT DOCUMENTS

| | | |
|---|---|---|
| 713,177 A | 11/1902 | Thomsen |
| 962,844 A | 6/1910 | Kaufmann |
| 1,371,438 A | 3/1921 | Prucha |
| 1,408,654 A | 3/1922 | Stilwell |
| 1,674,540 A | 6/1928 | Bagley |
| 2,279,443 A | 4/1942 | Chanosky |

(Continued)

OTHER PUBLICATIONS

Author: Marty DeAngelo Date Published: Aug. 23, 2002 www.abode.com-<Home/Communities/Exchange/Photoshop.*

*Primary Examiner*—Christopher Mahoney
(74) *Attorney, Agent, or Firm*—Phillip E. Decker; Mesmer & Deleault, PLLC

(57) ABSTRACT

A stereoscopic universal digital camera adapter in the form of a quick-snap, center sliding plate and guide track adapter with built-in leveling jacks, a horizontal level vial and dead-end stops between 0 and 55 mm, which is similar to the average distance between the center of two human eyes. This pocket-sized universal adapter is for use with digital cameras to better facilitate, and quickly and easily capture very precise quality still pair of images of a scene or a subject by any person. The invention helps to capture a stereo pair of images. The two image pairs can then be downloaded into a computer and/or printed on paper through printing devices or viewed in any desired stereoscopic, anaglyph or interlaced viewing formats.

2 Claims, 15 Drawing Sheets

U.S. PATENT DOCUMENTS

| | | |
|---|---|---|
| 2,671,392 A | 3/1954 | Robins |
| 2,791,950 A | 5/1957 | Oppenheimer |
| 3,586,278 A | 6/1971 | Simons ................... 248/165 |
| 3,800,307 A | 3/1974 | Wechsler ................ 95/18 R |
| 4,063,265 A | 12/1977 | Lo et al. ................. 354/294 |
| 4,591,250 A * | 5/1986 | Woodruff ................ 396/50 |
| 4,768,049 A | 8/1988 | Barrett et al. ........... 354/294 |
| 4,897,678 A * | 1/1990 | Leberl et al. ............ 396/428 |
| 5,809,355 A * | 9/1998 | Lungershausen et al. .... 396/319 |
| 5,993,077 A * | 11/1999 | Jones ..................... 396/428 |
| 6,301,447 B1 | 10/2001 | Jackson et al. ........... 396/329 |
| 6,435,738 B1 | 8/2002 | Vogt ....................... 396/419 |
| 7,077,582 B2 * | 7/2006 | Johnson ................... 396/428 |
| 2003/0090482 A1* | 5/2003 | Rousso et al. ............ 345/419 |
| 2003/0128975 A1 | 7/2003 | Shevick ................... 396/428 |

* cited by examiner

STEREOSCOPIC UNIVERSAL DIGITAL CAMERA ADAPTER

BACKGROUND

This application is a 371 of PCT/US/04/04331 filed Feb. 13, 2004, which is a continuation of 10/366,099 filed Feb. 13, 2003, abandoned, and is a continuation of 10/378,253 filed Mar. 3, 2003, abandoned, and is a continuation of 10/378,531 filed Mar. 3, 2003, abandoned, all of which are hereby incorporated by refrrencc in their entireties.

1. Technical Field

The present invention relates to stereoscopic photography and the capture of a matched pair of digitized photo images by use of any single lens digital camera and stores these images in two separate files, one to represent a right-eye view of the intended subject and another for a left-eye view. These two images can then be combined for viewing with various three-dimensional formats such as parallel, cross-eyed viewing, with hand-held viewers, anaglyph or liquid crystal shutter glasses, or lenticular sheet viewing or more particularly to a digital camera guiding track apparatus for accurately taking a stereo pair of digital images of a scene or a subject.

2. Description of the Related Art

Typically, a stereoscopic camera comes with a built-in pair of left and right eye views of a subject and captures two images on a filmstrip for slide viewing. These cameras are old and do not offer the convenience, ease of use, and economy of digital cameras. Since no such stereoscopic digital cameras exist to date, it was important to create a new sliding mechanism that easily allows the capture of left and right digital images by a single lens digital camera.

Although several patents of various apparatus have been designed to provide the ability to take a left and right eye view of a scene or a subject as suggested in prior art U.S. Pat. No. 5,809,355 issued Jan. 10, 1997; U.S. Pat. No. 4,768,049, issued Aug. 30, 1988; U.S. Pat. No. 2,791,950, issued May 1957; U.S. Pat. No. 2,279,443, issued April 1942; U.S. Pat. No. 1,371,439, issued Mar. 15, 1921; and U.S. Pat. No. 713,177, issued Nov. 11, 1902; an ordinary camera with only a single capture lens can be used to sequentially expose respective images of the same scene or subject on a pair of adjacent film frames when the camera is in right and left picture-taking positions. A suitable distance between the right and left photo-capture positions is chosen to obtain a matched pair of images that, when looked at together through an appropriate stereoscopic viewer, shows a stereoscopic three-dimensional image of the original scene or subject. All come with a tripod support for the camera and typically having two pre-set locations for locating the camera in the right and left photo-captures positions.

In addition, other sliding plates are too slow to operate, and capture two left and right views of a subject with a single camera. This is especially hard to do when taking stereoscopic portrait photography with a single camera, because humans are less able to stand still for a long period of time until the user releases, then shifts, and then locks the camera from right to left requiring a new, better, and faster method.

SUMMARY OF THE INVENTION

The present invention relates to a stereoscopic digital camera slide plate and track guide apparatus which allows for the precise positioning of just one single lens digital camera at each of two right/left locations to be selected from a list of pre set locations. Two individual digital photographic representations of a scene or a subject are then captured and stored on the digital camera-recording medium for further download to a computer or a suitable printer.

Any macro, zoom or wide-angle lens can be used in the process. The stereoscopic digital camera apparatus mainly consists of a sliding plate with a built-in bolt to attach to the bottom of a digital camera and a matching track guide with the means to attach to a tripod, but can also be leveled without the use of a tripod with the built-in four supporting leveling jacks located at the four corners of the track guide. The track guide also has a built-in horizontal level to support the leveling process and produce precise stereoscopic pairs of digital photographs. This stereoscopic apparatus is designed to be ultra-compact, highly functional, and extremely easy to use.

The quick-lock/quick-release thumb operated cylinder is a unique method to quickly lock the sliding plate and attached camera in a position to stop it from sliding in either direction while capturing a scene. This mechanism allows for the set positions to be freely selected by the user depending on the distance away from the intended subject or the type of lenses or zoom function being used.

What is also unique about this invention is that the digital camera and the attached sliding plate can easily be placed starting at an angle to position the front side of the sliding plate under the locking cylinder on the guiding track, then snapped down onto the guiding track through the center. This mechanism allows both left and right ends to provide automatic stop points for the default left and right positions on the guiding track where both ends are closed, making it extremely fast to take repeated and accurate left and right photographs in a record time, which makes this invention the best stereoscopic single digital or SLR adapter ever created for human portrait photography, where the requirement to stay still is extremely minimized.

Another embodiment of the invention does not require a threaded tripod socket on the bottom of the camera. This allows the invention to be used with disposable cameras or the very small digital cameras that do not have a tripod socket.

Yet another embodiment of the present invention has the same function as the first embodiment, but is more lightweight and compact. It employs gears and swivels to control the distance between the left and right positions.

DESCRIPTION

Table of Reference Numbers

Figure 1:
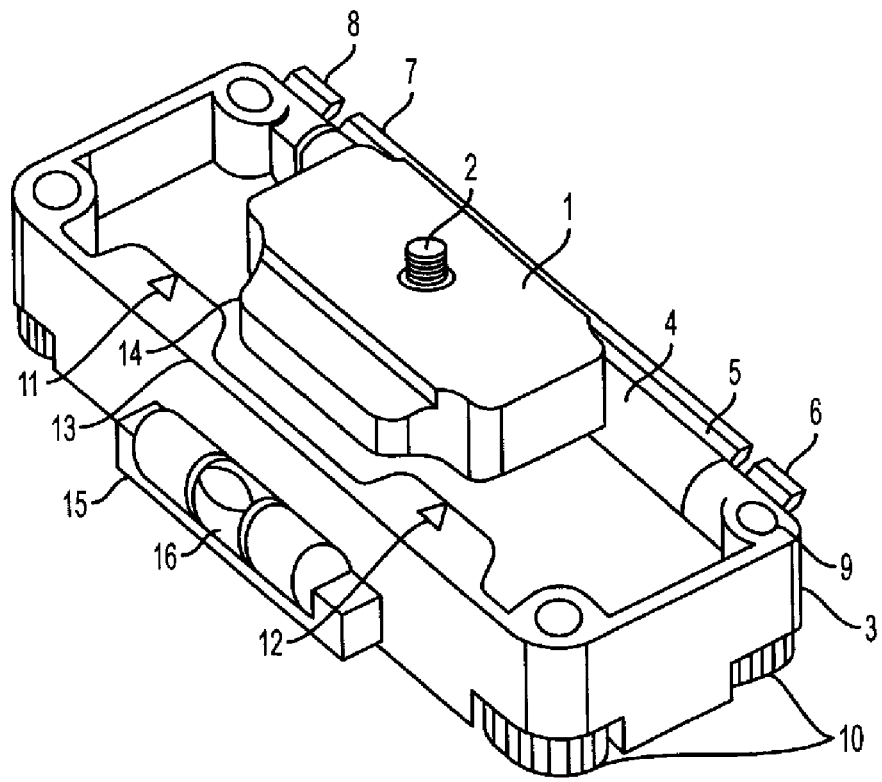
FIG. 1 shows the sliding plate, ready to fit onto the guiding track.

The following table of drawing reference numbers will aid in understanding the scope of the specification.
1 sliding plate
2 screw
3 guiding track
4 quick-lock cylinder
5 cylinder notch
6 fixed notch
7 cylinder notch
8 fixed notch
9 guide track corner
10 leveling jack
11 default left position mark
12 default right position mark
13 center back opening on guiding track
14 sliding plate back part
15 level vial socket
16 level vial
17 sliding plate front lip
18 left indents
19 right indents
20 locking cylinder back side
21 locking cylinder bottom front side
22 guide track left and right sides
31 sliding guide
32 back ridge
33 base plate
34 distance scale
35 rubber or cork mat
36 right end of base plate
37 left end of base plate
39 level vial
40 mechanism to mount tripod
50 bottom member plate
52 middle member plate
53 top member plate
54 fastening mechanism
55 level vial
56 tripod
57 middle plate screw
58 rotating threaded socket
59 middle plate opening
60 top member screw
61 threaded socket
62 threaded socket
63 extended bolt
23 standard threaded socket
64 male ridges
65 standard bolt
66 left back opening on middle member plate
67 right brake
68 right back opening
69 right brake on bottom plate
70 threaded tripod socket
71 left brake on bottom plate
72 left stop brake on top member plate
73 left level vial screw
74 right level vial screw
75 macro adapter
76 right bent end
77 left bent end
78 left macro adapter stop brake
79 right macro adapter stop brake
80 left stop brake area
81 right stop brake area
82 left top member plate stop brake
83 right top member plate stop brake Embodiment 1

Figure 2:
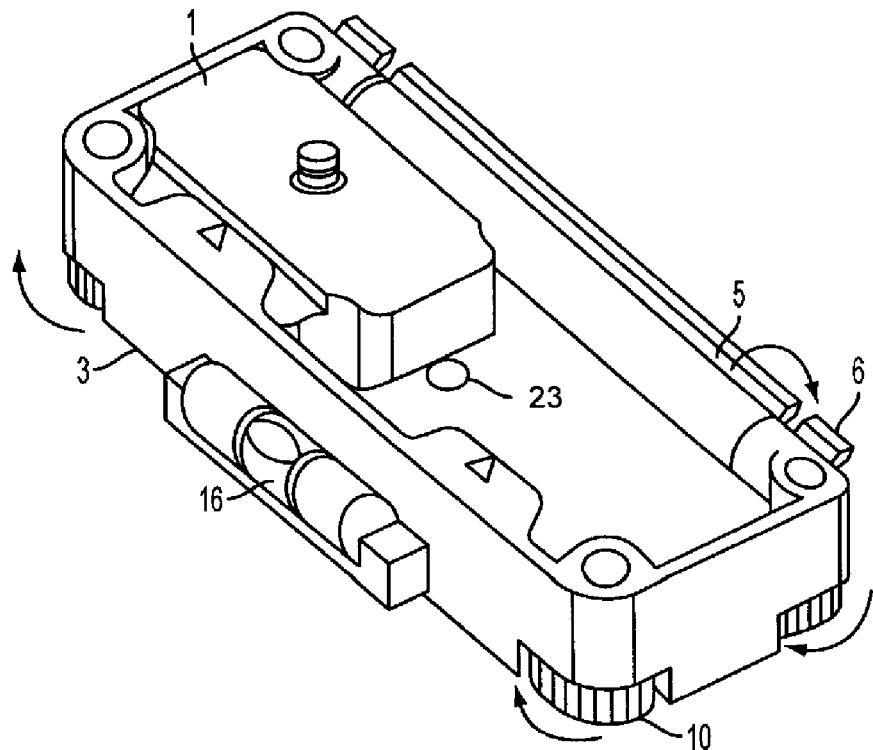
FIG. 2 shows the sliding plate in the left default position on the guiding track before it is locked with the locking cylinder through a quick twist using the thumb and index with the help of the right.

Referring first to FIGS. 1 and 2, here is how the Stereoscopic Universal Digital Camera Adapter is best used:

For use with a tripod, in FIG. 1, the user first attaches the guiding track 3 by use of the standard threaded socket 23 located at the bottom center of the guiding track in FIG. 2, then screws the standard bolt on the tripod into that threaded socket tightly, and then levels the tripod horizontally with the help of the level vial 16. The level vial 16 is secured to the guide track 3 using a level vial socket 15. The guiding track 3 preferably has a length, width, and height between 10 cm×4 cm×1.5 cm and 20 cm×5 cm×2.5 cm.

For use without a tripod, the user places the guiding track 3 on the desired surface that provides the right proper spot and direction for capturing the photographs. With the use of the leveling jacks 10, the user can then level the guiding track with the help of the level vial 16. It is not recommended to use the level jacks 10 for highly inclined surfaces, where the leveling could be beyond the capability of the leveling jacks. Leveling jacks 10 are placed in each corner 9 of the guide track 3.

With the use of any digital camera that comes ready with a standard threaded socket at the bottom of the base of the camera, the sliding plate 1 by means of the standard attached screw 2 in the center of the plate, the plate 1 is first screwed to the bottom of the base of the camera where the threaded socket is located (camera not shown). Attach the camera to the snap-on center of the plate 14 pointing towards the back of the camera, and the lens to the front, with the screw tightened in a way that makes the back of the camera parallel with the length of the sliding plate 1.

Both the digital camera and the sliding plate 1 are brought over the center of the guiding track 3. In order to place the sliding plate 1 with the attached camera on the guiding track 3, the camera and the plate 1 are then tilted forward in order for the quarter cylindrical piece in the front of the sliding plate to snap in the allotted space just under the quick-lock cylinder 4 on the guiding track 3. Then the digital camera and the sliding plate 1 are brought down from the back through the center for the guiding track where the back part of the sliding plate 14 fits into the center back opening on the guiding track 13.

Figure 8:
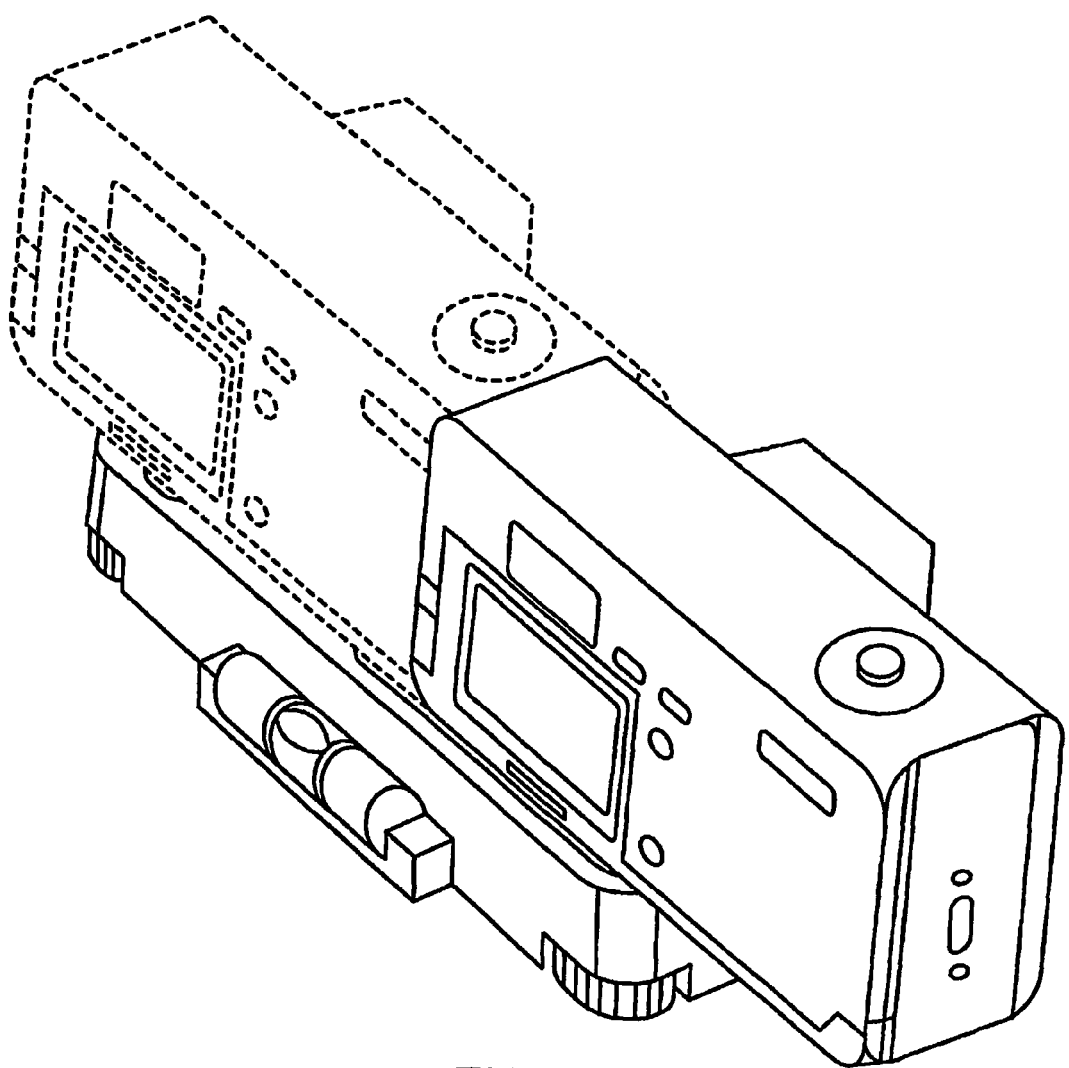
FIG. 8 shows the stereoscopic universal digital camera adapter with a digital camera attached, and in the right position after already capturing a left photograph in the left position, and recording the digital image onto the digital camera.

At this point the sliding plate 1, along with the attached digital camera, should be parallel with the guiding track 3. Then by holding the camera, the user slides the digital camera by means of the sliding plate 1 all the way to the left until the digital camera comes to a stop and no longer can move further on the guiding track (this is the default pre-set left-view position) then the user captures a left-view image of the desired scene or subject, then quickly slides the digital camera all the way to the right until the digital camera comes to a stop and no longer can travel further to the right on the guiding track 3. This is the default pre-set right-view position. He then captures a right view image of the scene or subject. A mark 11 on the guide track body 3 indicates the default left position. A corresponding mark 12 on the guide track body 3 indicates the default right position. The position of the camera on the apparatus sliding back and forth is shown more fully in FIG. 8.

As a safety measure, if the user intends to move the camera and the stereoscopic adapter with or without the tripod from place to place so that the adapter and digital camera become tightly attached, e.g., to avoid having the digital camera fall, the user can then turn the quick-lock cylinder 4 down. He does this by placing his thumb on the cylinder notch 5 or 7 from the top and the side of the index finger of the same hand below the fixed notch 6 or 8 on the guiding track and twisting the thumb down and the index finger up to tightly secure and lock the digital camera on the track guide in a secure position. To release the digital camera and sliding plate from the track guide, a twist back in the opposite direction does the trick.

After taking the left-view photograph, users may decide to move the camera a shorter distance than the 55 mm standard distance on the track. The 55 mm distance is significant because it is the average distance between the centers of two human eyes. Users may also decide to stop at any shorter distance to capture the right-view corresponding image. This is especially helpful when capturing photographs of a subject that is very close to the camera, e.g., less than 2-2.5 m (6-8 feet) away from the lens.

Figure 3:
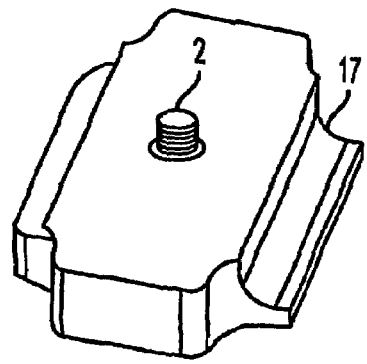
FIG. 3 shows the sliding plate with the standard tripod-like bolt to attach to the bottom of the camera. The front of the sliding plate is shaped to easily fit under the locking cylinder on the guiding track.

FIG. 3 is a perspective view of the slide plate 1 assembly. The sliding plate front lip 17 is designed to easily fit under the locking cylinder 4.

Figure 4:
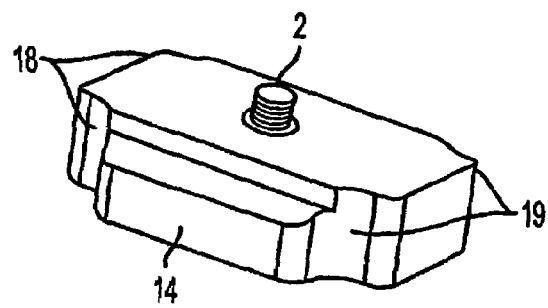
FIG. 4 shows the sliding plate and the bolt.

FIG. 4 is another perspective of the slide plate 1 assembly of FIG. 3. The left back and front circular indents 18 are formed to make a snug fit with the level jack 10 casings on the left side of the guide track 3. The right back and front circular indents 19 are formed to make a snug fit with the level jack 10 casings on the right side of the guide track 3.

Figure 5:
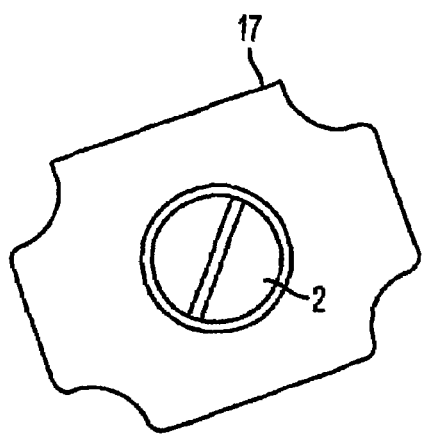
FIG. 5 shows the bottom side of the sliding plate with one example of a bolt mechanism, here shown as a coin screw mechanism.
Figure 6:
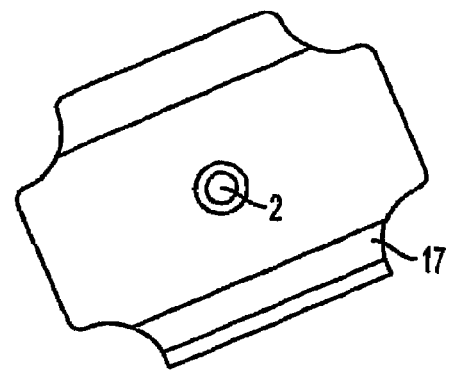
FIG. 6 shows the top of the sliding plate with the top of the bolt where the bottom of the camera is attached.

FIG. 5 is a bottom plan view of the sliding plate 1 with one example of a bolt mechanism 2. The mechanism shown is a coin screw mechanism. FIG. 6 is a top plan view of the sliding plate 1 showing the top of the bolt 2.

Figure 7:
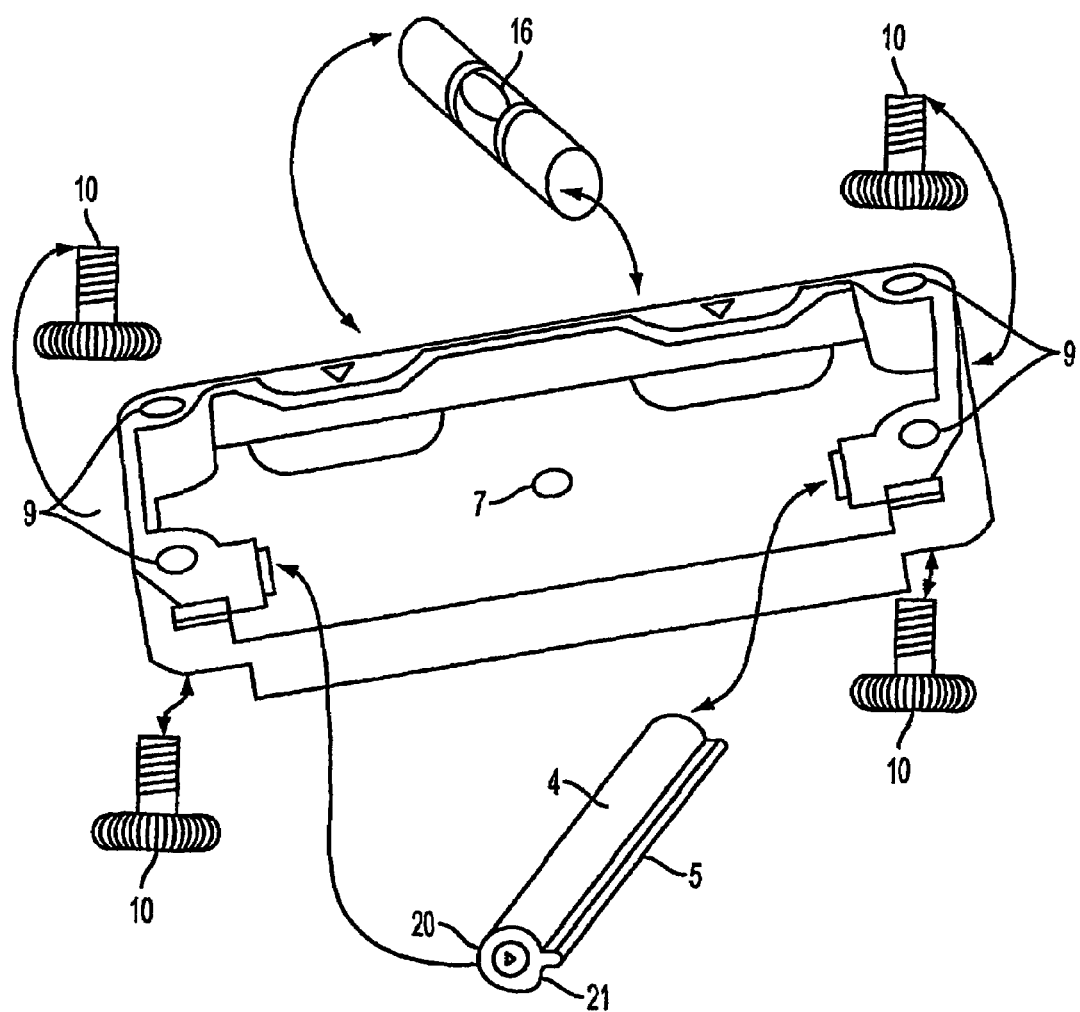
FIG. 7 shows how the various parts fit together on the guiding track.

FIG. 7 is an exploded view showing how the parts fit together. The locking cylinder 4 has a thinner back side 20 than the bottom front side 21 for the lock position, where it is thicker when twisted down against the front of the sliding plate 1. An example of how the locking cylinder 4 might fit onto the guide track left and right sides 22 is shown. Other mechanisms that would work include a supporting brass rod and suitable tightening springs, for example.

Users can then download the stereo pair of images onto a computer or printer and manipulate them with 3D stereo pair editing or mixing software, or a professional photo editor like PHOTOSHOP®, from Adobe, to create the desired stereoscopic or anaglyph viewing formats.

Embodiment 2

The above embodiment of the invention requires a threaded socket on the camera to guide the camera on the slide bar in order to capture quality stereoscopic photographs. This creates a problem for for a good number of consumers who purchase disposable film cameras or use new small, digital cameras that do not come equipped with a threaded tripod socket. For these consumers, there is no simple, inexpensive apparatus that helps them capture quality stereo pair left and right images on the market. Therefore, we felt the need to solve this problem and create a version of this invention having a slim plate with a back ridge and side guide to allow any consumer to capture quality stereoscopic images without the need to physically attach a camera to any apparatus by use of a tripod threaded socket.

This new stereoscopic apparatus allows for use on a flat surface and may be used with a tripod, but does not require one, as most novice or traveling camera users do not necessarily have access to a tripod. The back ridge could also include a horizontal level vial to make sure that the flat surface is leveled horizontally as the camera is pointed towards the scene to be photographed. In addition, with the compact slim nature of new digital and min- and micro-cameras as opposed to old, bulky SLR cameras, today's users expect such adapters to now be very compact and portable. Existing mechanisms found in a few shops or on the Internet are too cumbersome, bulky, and not simple enough for the novice consumer and all require the camera to have a threaded socket. Marketability demands and the growing sophistication of various free camera devices led to the creation of this embodiment of the invention, which is a very simplified and easy-to-use stereoscopic apparatus specifically targeted to novice, beginners, and users of all types of cameras.

Any macro, zoom, or wide-angle lens can be used in the process. This stereoscopic camera apparatus mainly consists of a base plate with a skid-resistant rubber cork bottom to keep it from prematurely sliding on top of a flat surface, and attached is a sliding guide with the means to slide on the back ridge of the base plate to guide the freely placed camera to the proper position. This stereoscopic apparatus is designed to be ultra-compact, slim, highly functional, and extremely easy to use for still photography.

Figure 9:
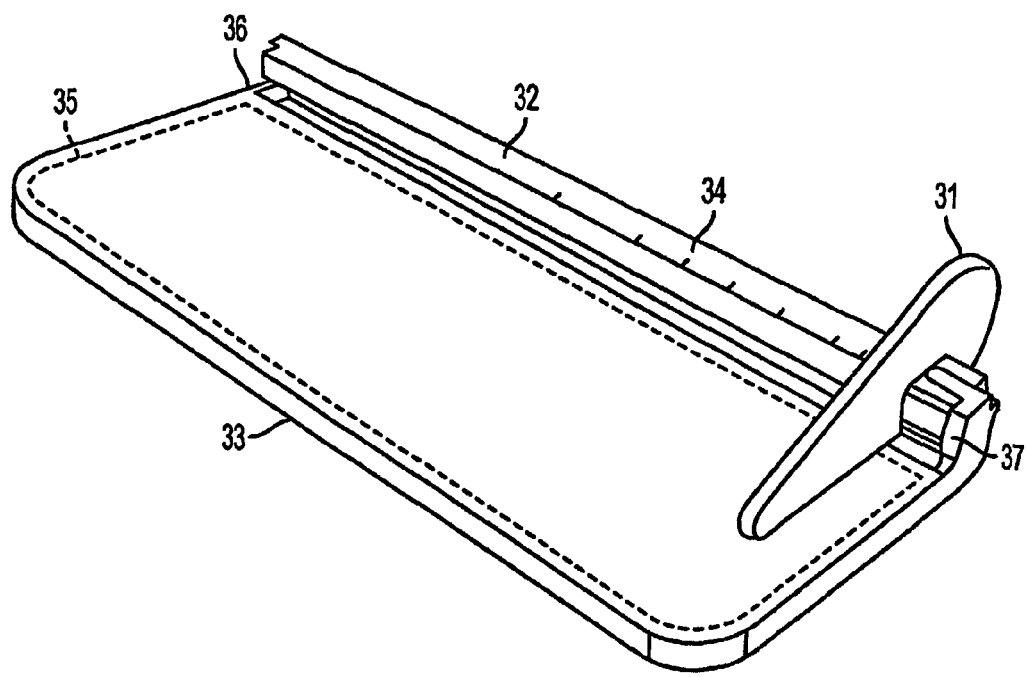
FIG. 9 and the following figures show another embodiment of the invention, where in this figure the slim stereoscopic base plate is ready for use along with the sliding guide on the back ridge in the left image capture position on the left side of the distance scale.

Turning now to FIG. 9, the slim, stereoscopic base plate 33 is readied for use along with the sliding guide 31 slideably attached to the back ridge 32 in the left image capture position on the left side of the distance scale 34. The position of the rubber or cork mat 35 on the base plate 33 is shown a dashed line in these views. The right end 36 of the base plate is where the sliding guide 31 is installed, and then slid all the way to the left, where it can go no further because the left end 37 of the base plate is closed, so the sliding guide 31 comes to a stop and does not fall out.

Figure 10:
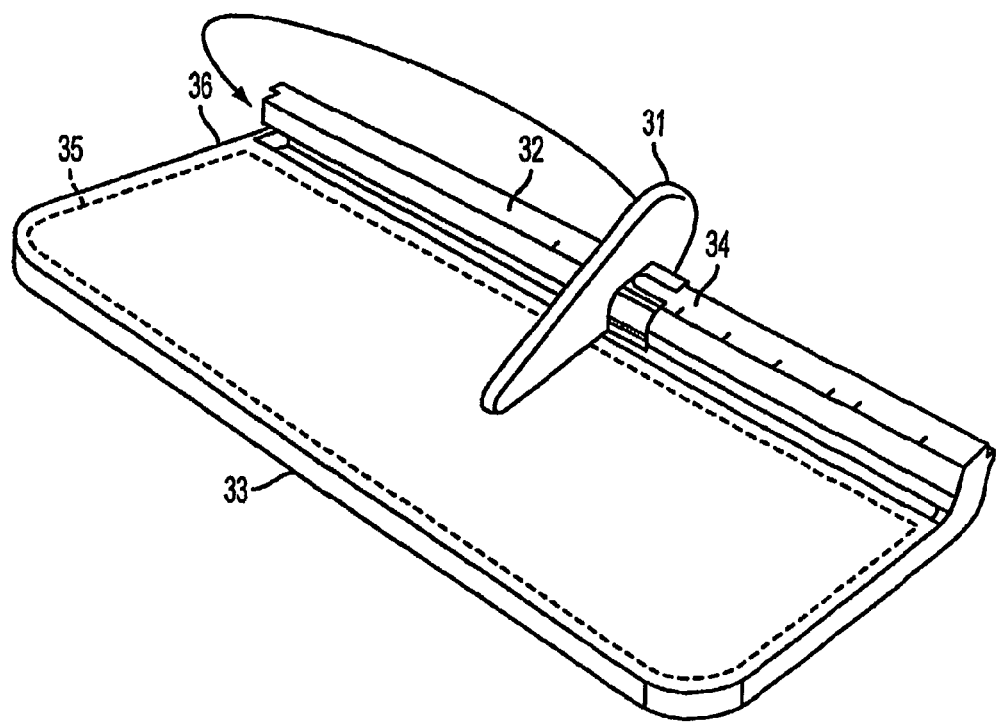
FIG. 10 shows how the sliding guide is slid onto the back ridge, and attached to the stereoscopic base plate through the right end and into a right image capture position.
Figure 11:
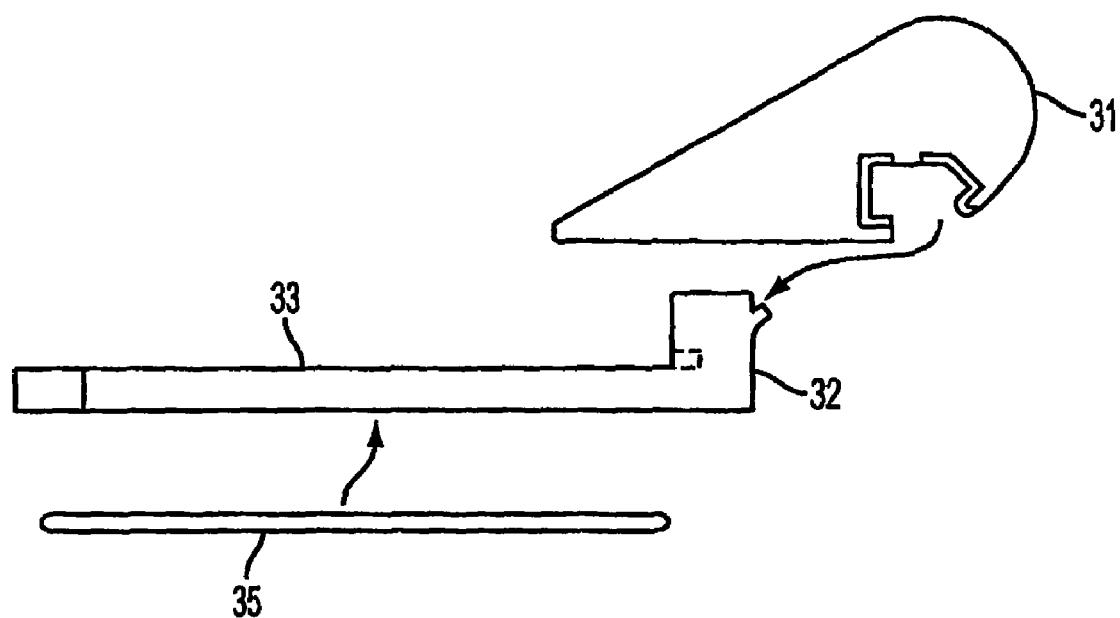
FIG. 11 is a side elevation of the stereoscopic base plate and the sliding guide, and how the sliding guide fits around the back ridge.
Figure 12:
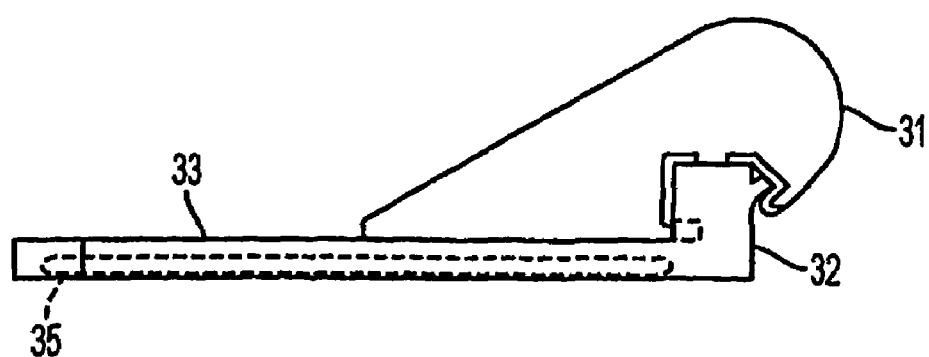
FIG. 12 is a side elevation, the same as FIG. 11, except that it shows the components assembled.

FIG. 10 shows how the sliding guide 31 is slid onto the back ridge 32 attached to the stereoscopic base plate 33 through the right end 36 and into a right image capture position. FIGS. 11 and 12 are side elevations of the stereoscopic base plate 33 and the sliding guide 31, and how the sliding guide 31 fits around the back ridge 32. FIGS. 11 and 12 also shows how the thin rubber or cork mat 35 fits under the base plate 33.

Figure 13:
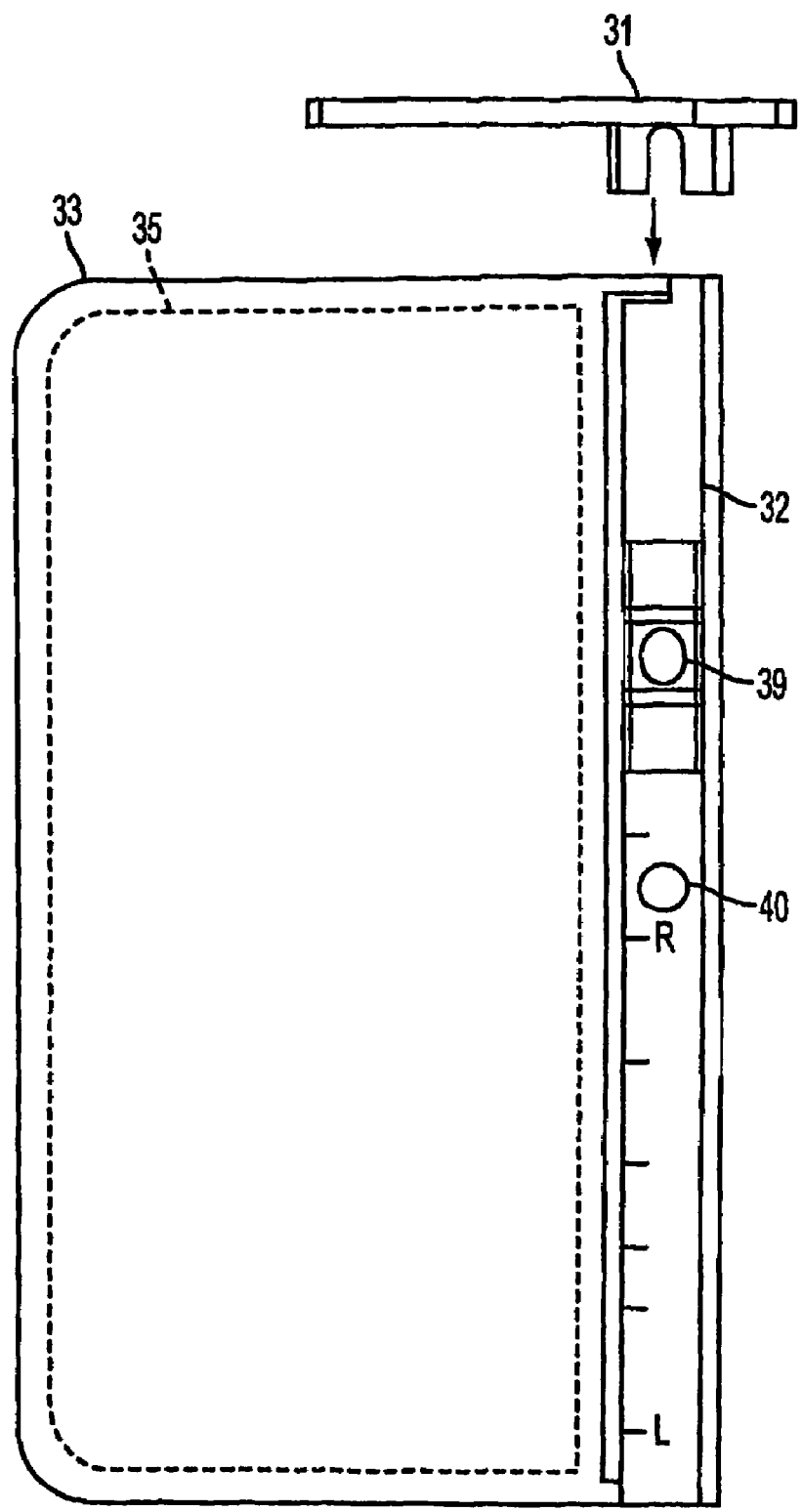
FIG. 13 is a plan view of the stereoscopic base plate and how the sliding guide is fitted on the back ridge.
Figure 14:
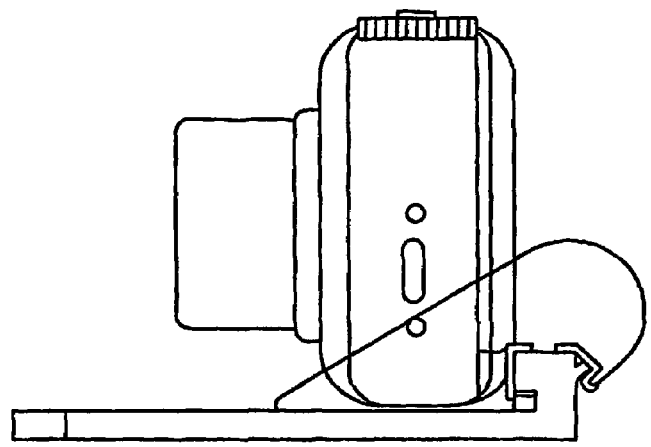
FIG. 14 is a side elevation showing how a sample camera is placed on the stereoscopic apparatus.

FIG. 13 is a plan view of the stereoscopic base plate 33 and the sliding guide 31, and how the sliding guide fits around the back ridge 32. The placement of the rubber or cork mat 35 is shown by a dotted line. A level vial 39 can optionally be attached to the base plate 33 at the back ridge 32 to help level the apparatus and camera. Another option is to provide a mechanism 40 to attach the apparatus to a tripod. The example shown in this figure is an internally threaded hole having a screw thread size matching the standard camera mount screw thread. FIG. 14 is a side elevation showing how this embodiment is used with a camera installed.

Figure 15:
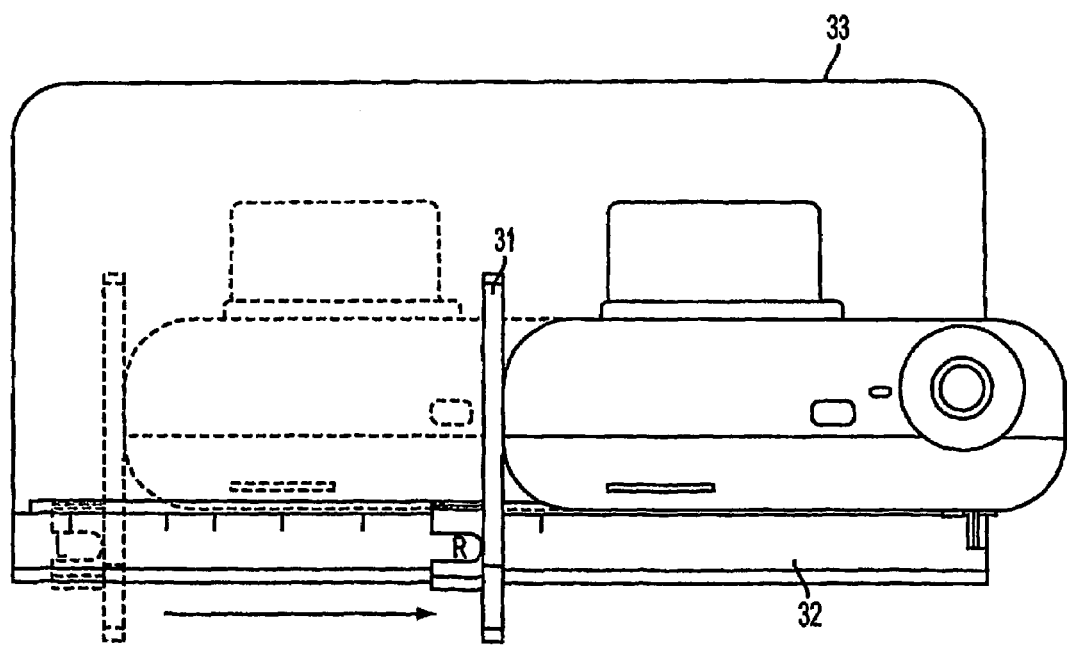
FIG. 15 illustrates how a user directs a camera towards the subject to be photographed.

FIG. 15 is a plan view showing how a user directs a camera towards the subject to be photographed. The dotted lines show the first "L" position capturing a left eye view of the subject. Then the sliding guide 31 and the camera are slid together on the base plate 31 to the "R" position to capture a right eye view of the subject. It also shows how the camera is placed flat against the back ridge 32, and from the side onto the sliding plate 31 to keep the camera in a straight linear position. The distance between the "L" and the "R" position is the average distance between two human eyes, which is acknowledged to be 65 mm or less. However, the user has the ability to experiment with different distances to obtain the best 3D effect.

Referring to FIGS. 9-15 altogether, more details of how the apparatus are now presented. For use on a flat, even surface, the user first attaches the sliding guide 31 to the base plate 33, and then places any camera, e.g., SLR, APS, instant, point-and-shoot, disposable, PC camera, or any camera capable of capturing still images, on top of the base plate 33 with the back of the camera towards the back ridge 32, with the front of the camera towards the subject to be photographed.

Then, with the sliding guide 31 positioned all the way to the left, and the camera tightly held against the back ridge 32 from the back and against the sliding guide 31 from the left, and with the left hand holding the stereoscopic base plate 33 tightly to the flat surface, the user snaps a left view shot of the intended subject.

After the shot is captured, the user then slides the camera and the sliding guide 31 to the right while maintaining a grip on the stereographic base plate 33 tightly onto the flat surface where the base plate 33 is placed to make sure that the camera travels n exactly a straight line. The distance to the right depends on the distance the camera lens is away from the intended object. If the lens is 3 m (10 feet) away or further, the user slides the guiding plate all the way to the far most right indicator on the scale 34. For distances around 2.1 m (7 feet), the user uses the 7 feet indicator, which is also the default "R" right position, which is a distance of separation from left to right of about 65 mm. Then, the user snaps a right eye view of the intended subject.

Depending on the camera being used, the user can either then develop the pictures and scan them, or download the stereo pair to a PC or printer to manipulate them with 3D stereo pair editing or mixing software, or a professional photo editor, to create the desired stereoscopic or anaglyph viewing formats.

Embodiment 3

Figure 16:
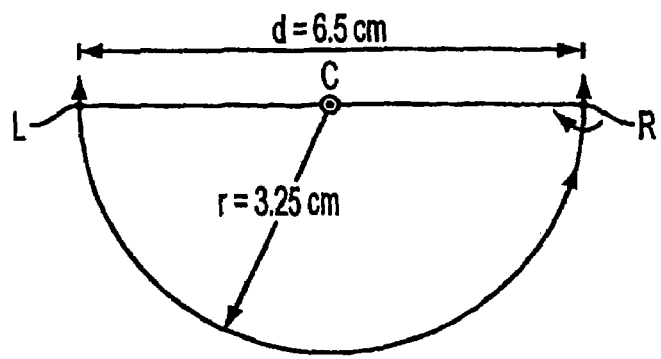
FIG. 16 is a diagram showing how a point can move from position "L" to position "R" around a center point "C" to travel a distance of 6.5 cm using a radius of 3.25 cm.

This embodiment, shown in FIG. 16-31, is for a more compact and lightweight adapter that uses gears and swivels to change between left and right positions. FIG. 16 is a diagram showing how a point can move from position "L" to position "R" around a center point "C" to travel a distance of 6.5 cm using a radius of 3.25 cm. This is the semi-circular path used for this invention to move a camera from a left position to a right position instead of the straight-line path of the first two embodiments. When connecting a tripod at a center point "C", then the point at "L" can rotate to the "R" position. To maintain the direction of point "L", the point itself rotates 180 degrees in the opposite direction.

Figure 17:
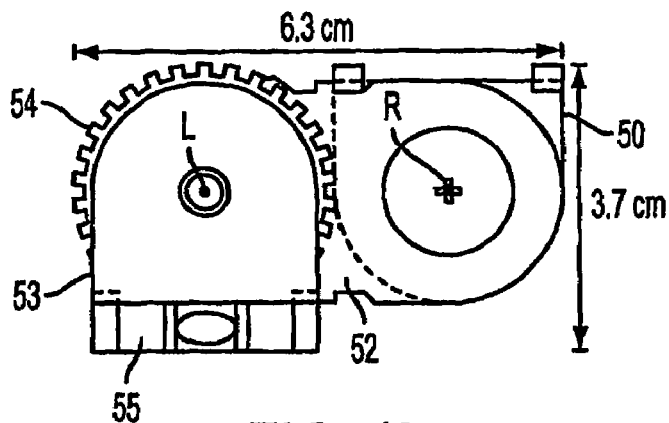
FIG. 17 is a plan view of the swivel stereoscopic apparatus in the left position.

FIG. 17 shows a plan view of the swivel stereoscopic apparatus in the left position. Item 50 is the bottom member plate. Item 52 is the middle member plate. Item 53 is the top member plate. Item 54 is the mechanism to turn and tighten the bolt and fasten the top member plate to the bottom of the cameral. Item 55 is the optional horizontal level vial.

Figure 18:
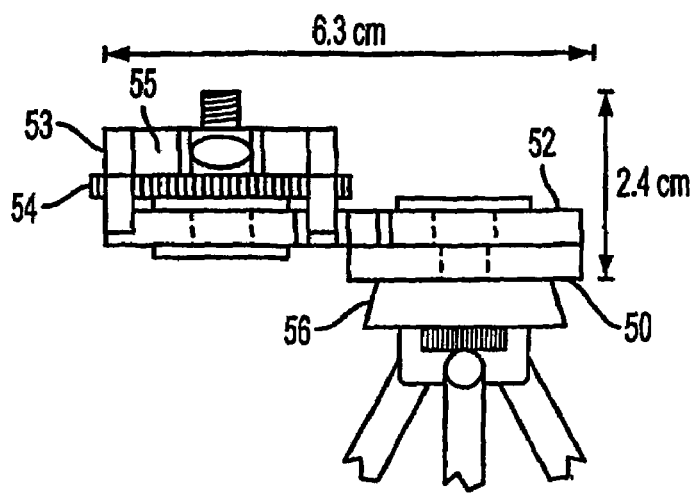
FIG. 18 is a rear elevation of the swivel stereoscopic apparatus in the left position attached to a sample tripod.
Figure 19:
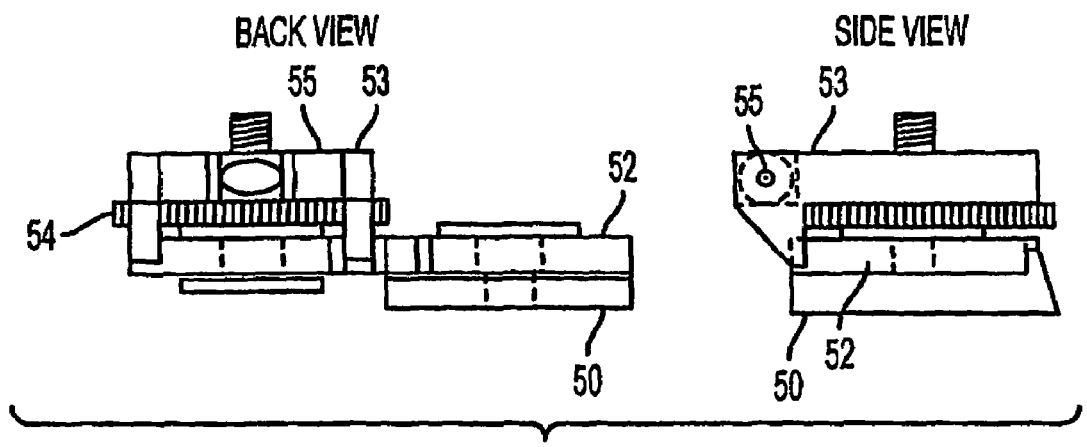
FIG. 19 is a rear and side elevation of the apparatus.

FIG. 18 is a rear elevation of the swivel stereoscopic apparatus in the left position attached to an optional tripod 56. FIG. 19 shows rear and side elevations of the swivel stereoscopic adapter.

Figure 20:
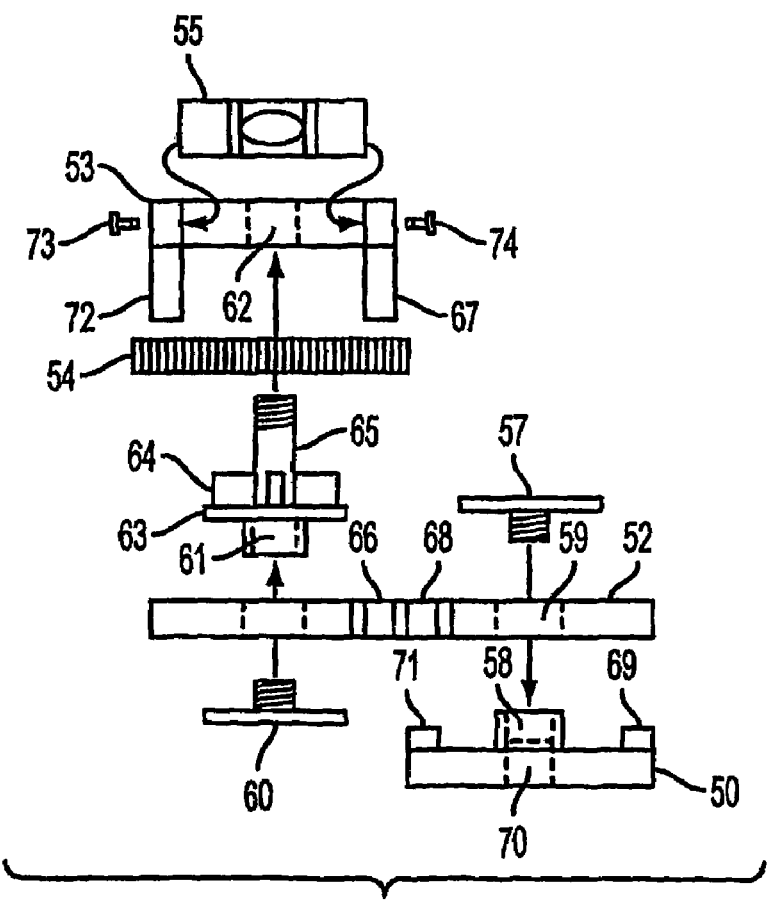
FIG. 20 is an exploded view of the various parts that make up the swivel stereoscopic apparatus.

FIG. 20 is an exploded view showing the different parts of the apparatus. Item 50 is the bottom member plate. Item 52 is the middle member plate. Item 53 is the top member plate. Item 54 is the mechanism to turn and tighten the bolt and fasten the top member plate 32 to the bottom of the camera. Item 55 is the optional horizontal level vial.

Item 57 is the screw that fits into the rotating threaded socket 58 that fits into the center of the middle plate through the opening 59 to connect the middle plate 52 to the bottom plate 50. Item 60 is the screw that bolts on the threaded socket 61 through the opening on the middle plate and that also encompasses the bolt that passes through the screw-on aid 54. It also screws on the top member plate 53 through the threaded socket 62.

Item 63 is the extended bolt that connects the middle plate 52, the top plate 53, and the bottom of the camera. Item 64 indicates the male ridges that pressure snap to the screw rotating aid 54. Item 65 is the standard bolt end that screws onto the top plate first, then to the bottom of the camera.

Item 66 is the left back opening on the middle member plate that serves to stop the top plate via the right brake 67 in place, and keep it pointing straight towards the subject or scene with the aid of the user holding the camera and pushing it slightly to the right. Item 68 is the right back opening that stops the idle plate from rotating beyond the semicircular arc on the right and by way of the right brake on the bottom plate 69.

Item 70 is the threaded socket that fits onto a tripod or monopod bolt. Item 71 is the left brake on the bottom plate that stops the middle plate 52 from rotating beyond the semicircular arc on the left. Item 52 is the left stop brake on the top member plate 53 that is stopped when the middle plate is swiveled toward the right onto the opening on the middle member plate. Items 73 and 74 are the left and right screws that hold the level vial 55 in place on the top member plate 53.

Figure 21:
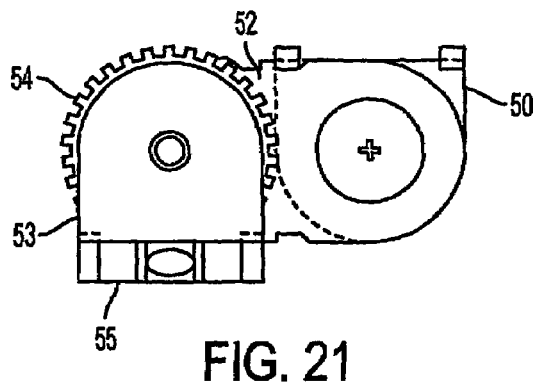
FIG. 21 is a plan view of the swivel stereoscopic adapter.

FIG. 21 is a plan view of the swivel stereoscopic adapter.

Figure 22:
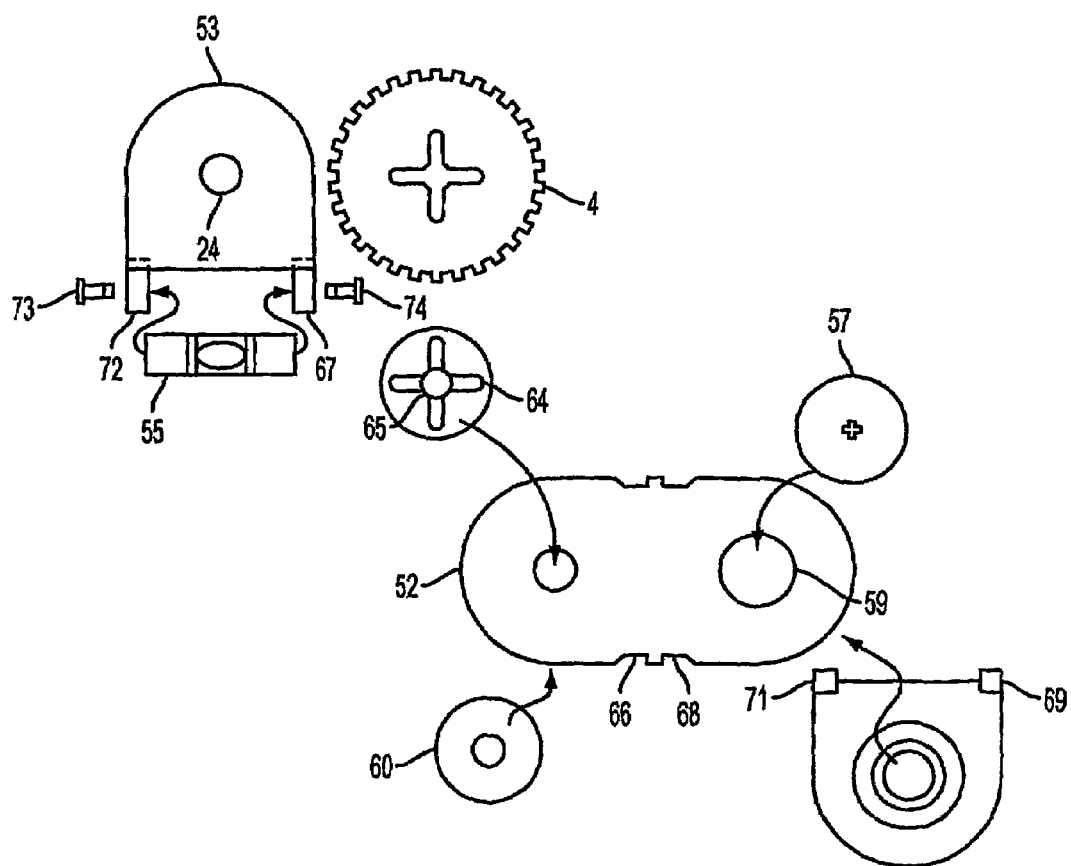
FIG. 22 is an exploded plan view of FIG. 21.

FIG. 22 is an exploded plan view of FIG. 21.

Figure 23:
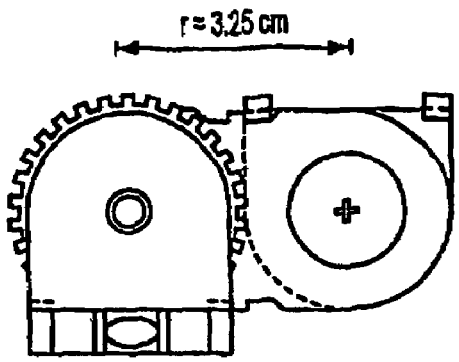
FIG. 23 is a plan view of the adapter pointing out the 3.25 cm radius.

FIG. 23 is a plan view of the adapter pointing out the 3.25 cm radius.

Figure 24:
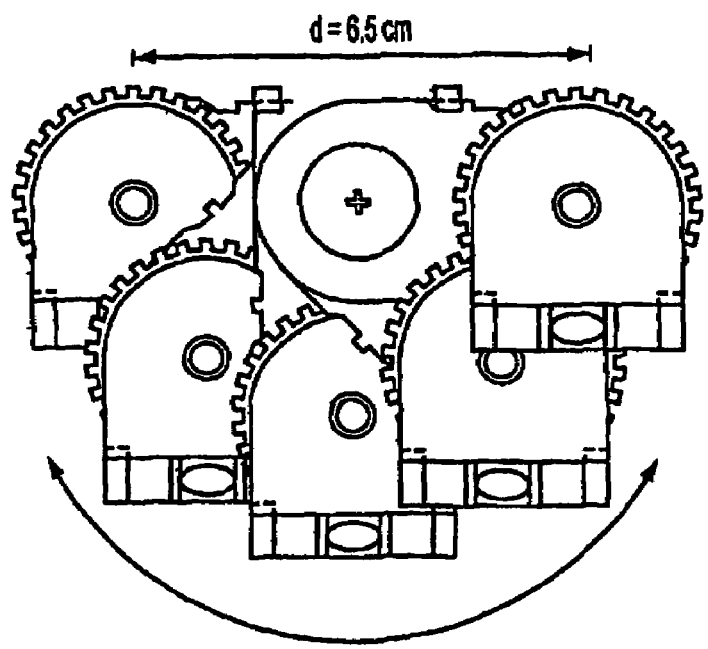
FIG. 24 is a stop-motion plan view of how the top plate rotates around the center of the bottom plate while maintaining a straightforward orientation.

FIG. 24 is a stop-motion plan view of how the top plate rotates around the center of the bottom plate while maintaining a straightforward orientation while being moved by the user.

Figure 25:
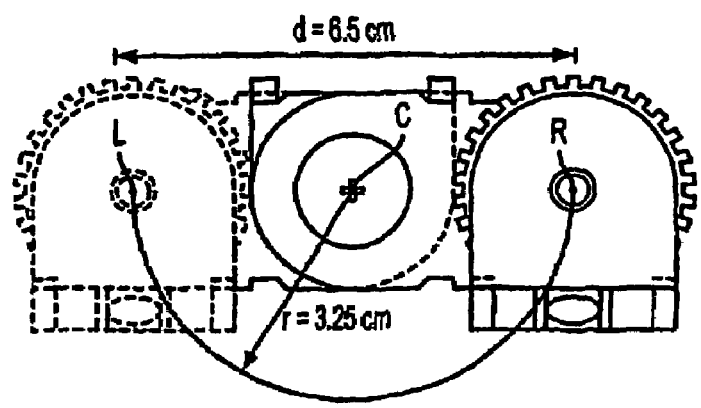
FIG. 25 shows the position of the swivel adapter after a full swivel from left to right and how the middle plate and top plates come to a stop in order to maintain a straight position.

FIG. 25 shows the position of the swivel adapter after a fill swivel from left to right and how the middle plate and top plates come to a stop in order to maintain a straight position.

Figure 26:
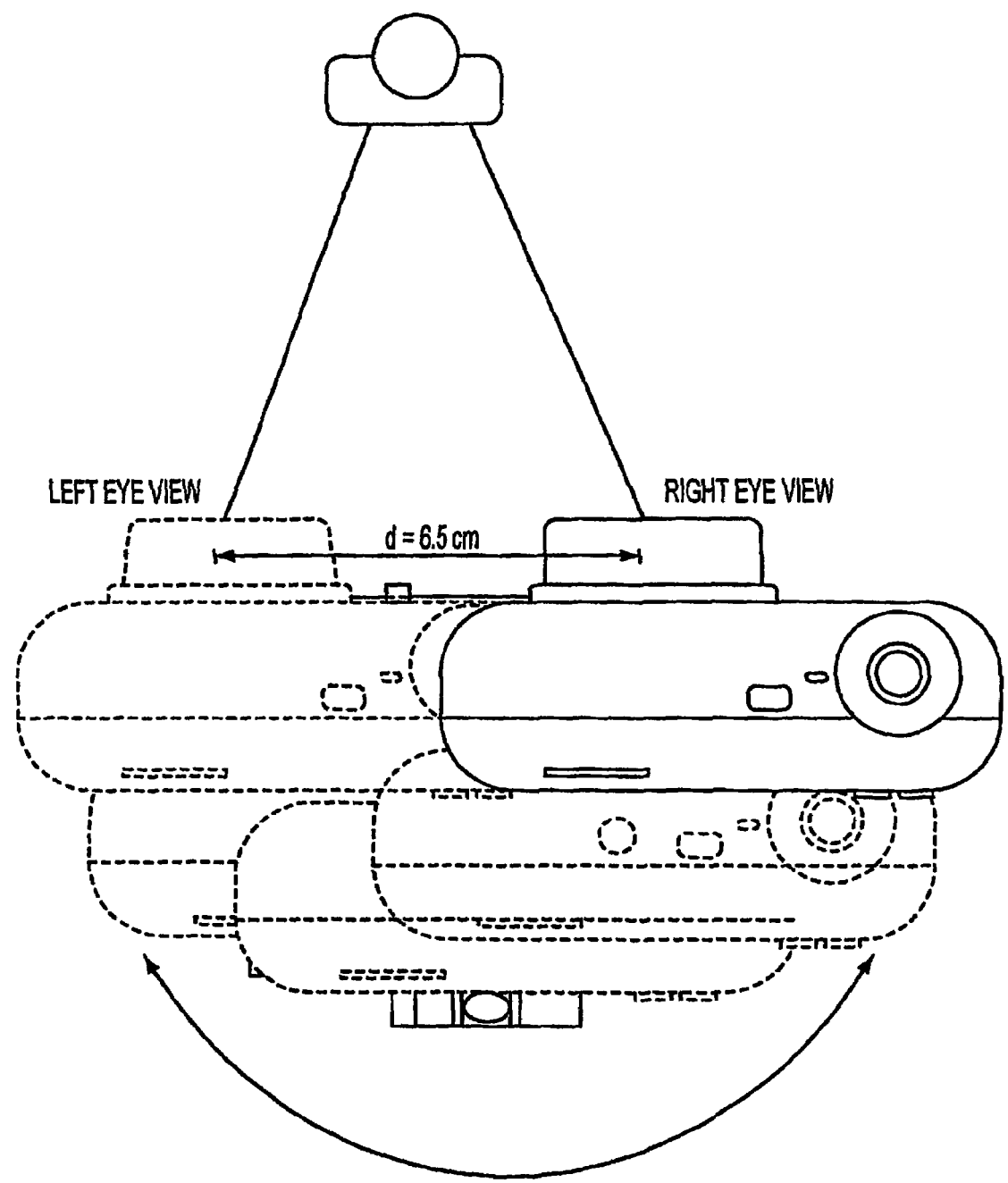
FIG. 26 shows how a mounted camera can be swiveled using the swivel stereoscopic apparatus to shift from a left-eye view to a right-eye view.

FIG. 26 shows how a mounted camera can be swiveled using the swivel stereoscopic apparatus to shift from a left-eye view to a right-eye view.

Figure 27:
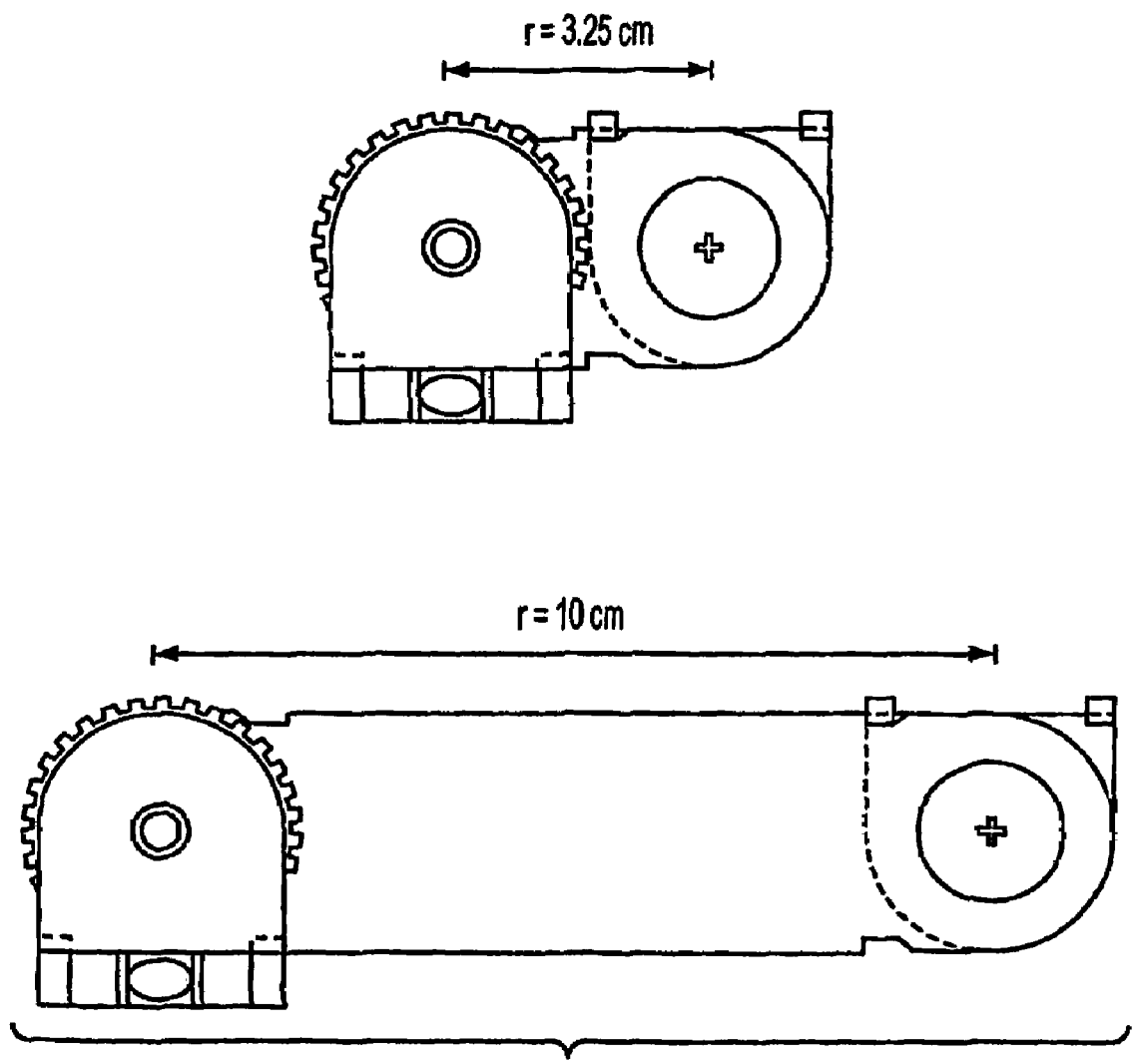
FIG. 27 shows examples of two sample sizes of swivel adapters.

FIG. 27 shows examples of two sample sizes of swivel adapters, one with a radius of 3.25 cm, and allows a diameter of 6.5 cm, the average distance between two human eyes. The second has a radius of 10 cm, which allows for capturing photos of the greatest stereoscopic depth from far away distances. It makes the left and right distance separation 20 cm. It can be appreciated that middle member plates can be shorted or elongated to create the desired length.

Figure 28:
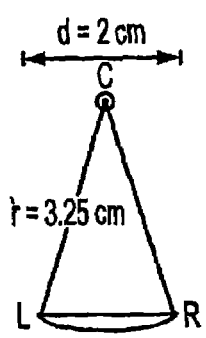
FIG. 28 is a diagram showing how a smaller arc path creates a shorter distance between the left and right positions.

FIG. 28 is a diagram showing how a smaller arc path creates a shorter distance between the left and right positions. In this case, it is a 2 cm space between the left and right point positions.

Figure 29:
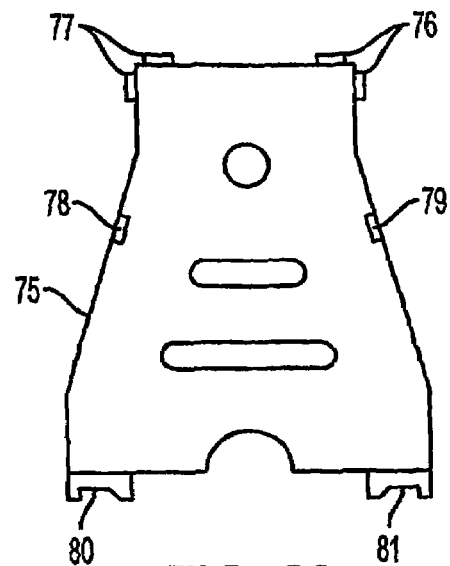
FIGS. 29 and 30 show a swivel stereoscopic macro adapter that fits under the swivel adapter.
Figure 30:
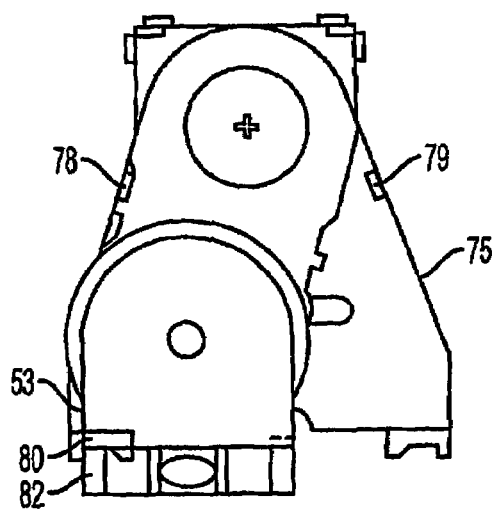

FIGS. 29 and 30 show a swivel stereoscopic macro adapter that fits under the swivel adapter. It is tightly positioned between the bottom member plate and the tripod screw. FIG. 30 shows the swivel plate fitted over the macro adapter 75. Items 76 and 77 are the right and left bent ends that extend upwards to hold the bottom member plate. Items 78 and 79 are the left and right stop brakes on the macro adapter that restrict the movement of the middle plate to the left and right in order to maintain a smaller arc travel path. Items 80 and 81 indicate the areas where the left and right stop brakes 82 and 83 on the top member plate 53 respectively come to a complete stop.

Figure 31:
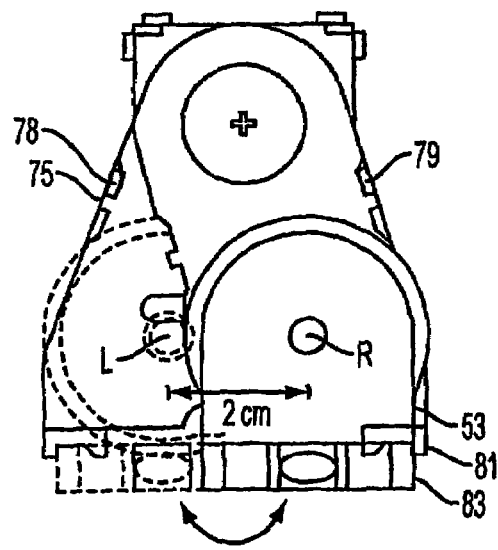
FIG. 31 shows how the top member plate swivels from left to right to a total separation distance of 2 cm.

FIG. 31 shows how the top member plate swivels from left to right to a total separation distance of 2 cm. This is beneficial for taking pictures from a distance of 30 cm to 90 cm from the subject to be photographed.

In operation, the user first attaches the bottom plate 50 to a monopod, tripod 56, or a mini-tripod bolt, and is tightened. The user then, by use of the screw aid bolt 54 of the top plate 53, screws to the bottom of the camera where the threaded socket exits, and secured it tightly in a fashion where the level vial 55 is placed parallel to the backside of the camera. When this is done, the camera is attached to the swivel stereoscopic apparatus, which is in turn attached to the tripod. Using the level vial 55, and the tripod 56, the camera can be precisely leveled horizontally by adjusting the tripod.

The user then swivels the camera to the left position, for example, by holding the camera and twisting it to the back and left in the semicircular path. When it comes to a stop, swivel the camera towards the inside as it turns 180 degrees in the opposite rotation direction to come to a straight line left stop position. As the apparatus, tripod, and camera lens are pointed towards the scene to be photographed, the user captures a left-eye view shot, as in FIG. 25.

Then the user swivels the camera to the right position by holding the camera and twisting it to the back and left in a semicircular motion. When it comes to a stop, the user swivels the camera towards the inside to come to a straight line right stop position, and he then captures a right-eye vie shot. Of course, the user can choose the take the left shot before the right, or visa versa.

If the user wishes to capture close-up shots, it is best to use the macro adapter as shown in FIG. 29. The macro adapter is placed between the bottom plate and the tripod. Then the same steps as above are repeated, except that the swivel makes a smaller arc.

Users can then process, scan, or download the stereo pair of images onto a computer or printer and manipulate them with 3D stereoscopic editing or mixing software, or a professional photo editor, to create the desired stereoscopic or anaglyph viewing formats.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

The invention claimed is:

1. A camera adapter apparatus for taking stereoscopic 3D pictures comprising
    a guiding track having a recess forming dead end stops and a mechanism for attaching the guiding track to a tripod,
    a slide plate adapted to slide substantially only back and forth within the recess,
    a bolt mechanism assembled to the slide plate having a standard camera attachment external screw thread,
    a quick-lock cylinder to quickly lock a camera secured to the slide plate to the track guide and release the camera from the track guide; and
    a leveling mechanism for leveling the track guide, wherein the leveling mechanism is at least one of a leveling jack and a level vial secured to the track guide parallel to the bottom of the recess.

2. The apparatus of claim 1, said slide plate comprising a front lip adapted to engage and release the quick-lock cylinder.

* * * * *